US010394472B1

(12) United States Patent
Taylor et al.

(10) Patent No.: US 10,394,472 B1
(45) Date of Patent: Aug. 27, 2019

(54) CLASSIFICATION AND IDENTIFICATION FROM RAW DATA WITHIN A MEMORY DOMAIN

(71) Applicant: EMC IP Holding Company LLC, Hopkinton, MA (US)

(72) Inventors: Kenneth J. Taylor, Franklin, MA (US); Randall H. Shain, Wrentham, MA (US); Adrian Michaud, Carlisle, MA (US); Wing-Kin Au, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 15/086,989

(22) Filed: Mar. 31, 2016

(51) Int. Cl.
*G06F 12/00* (2006.01)
*G06F 3/06* (2006.01)

(52) U.S. Cl.
CPC .......... *G06F 3/0626* (2013.01); *G06F 3/0659* (2013.01); *G06F 3/0683* (2013.01)

(58) Field of Classification Search
CPC combination set(s) only.
See application file for complete search history.

(56) References Cited

U.S. PATENT DOCUMENTS 9,092,159 B1 * 7/2015 Taylor ................... G06F 3/0685
2006/0039603 A1 * 2/2006 Koutsky ............ G06K 9/00147
382/165

* cited by examiner

*Primary Examiner* — Yong J Choe
(74) *Attorney, Agent, or Firm* — Ryan, Mason & Lewis, LLP

(57) ABSTRACT

A system, computer program product, and computer-executable method of managing one or more tiers of memory of a host computing system, the system, computer program product, and computer-executable method including accessing a portion of raw data from a memory page associated with data stored on the one or more tiers of memory, sampling the portion of raw data to select a sample data, analyzing the sample data to determine a sample category, and classifying the portion of raw data based at least in part by considering the sample category.

20 Claims, 9 Drawing Sheets

CLASSIFICATION AND IDENTIFICATION FROM RAW DATA WITHIN A MEMORY DOMAIN

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of managing one or more tiers of memory of a host computing system, the system, computer program product, and computer-executable method including accessing a portion of raw data from a memory page associated with data stored on the one or more tiers of memory, sampling the portion of raw data to select a sample data, analyzing the sample data to determine a sample category, and classifying the portion of raw data based at least in part by considering the sample category.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
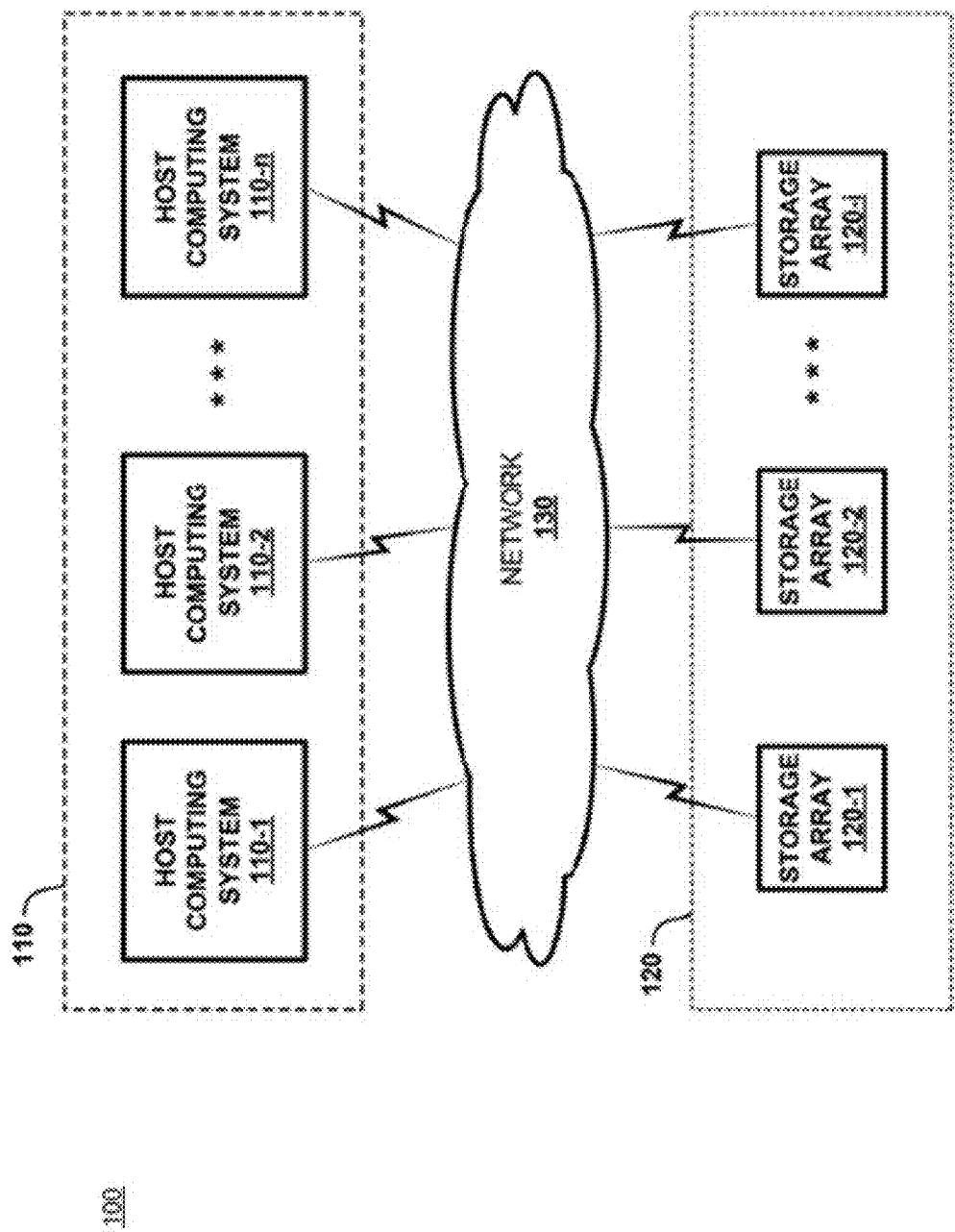
FIG. 1 is a high-level schematic illustration of a computing system which can be configured with a memory centric architecture that supports archived memory, in accordance with an embodiment of the invention.

Traditionally, data storage providers using memory centric architecture (MCA) have attempted to increase read and write speeds to both memory and storage arrays. Generally, previous approaches would involve techniques such as hinting, tracing, and/or requiring user input to determine which applications were using what memory. Typically, while hinting, tracing, and user input increase a data storage system's ability to adapt a user's application use, the information can lag behind current application activities. Conventionally, improvements to identification of an application's use of data storage would be beneficial to the data storage industry.

In many embodiments, the current disclosure may enable a data storage system implementing a Memory Centric Architecture (MCA) to unilaterally make a best-effort classification of data in a memory footprint from only the raw bits stored within the MCA. In various embodiments, the current disclosure may enable discovery of an application's use of data storage without hinting, tracing, or user input.

Memory Centric Architecture

It is to be understood that the terms "computing system" and "data storage system" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, any type of data storage system, or combination of data storage systems, including, but not limited to storage area network (SAN) systems, direct attached storage (DAS) systems, Hadoop Distributed File System (HDFS), as well as other types of data storage systems comprising clustered or distributed virtual and/or physical infrastructure.

The terms "application," "program," "application program," and "computer application program" herein refer to any type of software application, including desktop applications, server applications, database applications, and mobile applications. The terms "application process" and "process" refer to an instance of an application that is being executed within a computing environment.

The term "memory" herein refers to any type of computer memory accessed by an application using memory access programming semantics, including, by way of example, dynamic random-access memory (DRAM) and memory-mapped files. Typically, reads or writes to underlying devices are performed by an operating system (OS), not the application. As used herein, the term "storage" refers to any resource that is accessed by the application via input/output (I/O) device semantics, such as read and write system calls. In certain instances, the same physical hardware device is accessed by the application as either memory or as storage.

The term "metadata" as used herein is data that defines other data.

The phrase "memory region" as used herein is a named set of persisted memory pages.

Moreover, the term "tiering" as used herein with regard to memory or storage refers to the placement of information on a storage infrastructure resource commensurate with implementation of a defined policy. Such policies can take a variety of factors into account including, but not limited to: information utilization usage statistics (e.g., I/O reads, writes, memory access); customer information values associated with levels of service (e.g., gold, silver, bronze, production, test, sandbox, archive); and any other custom tiering stratification criteria.

The term "page cache" as used herein (also referred to as a disk cache) is a cache of disk-based pages kept in main memory (e.g., DRAM) by the OS for faster access. The faster access may result from a relatively faster memory technology and/or from avoiding relatively slow data transfer over a network or legacy bus. A page cache is typically implemented within a kernel via paging memory management facilities and, thus, is generally transparent to applications. Data is transferred between main memory and disk in blocks of fixed size, called "pages." As will be appreciated, the more requested pages reside in cache, the better is the overall performance. A paging memory management facility may maintain statistics on how frequently individual cache entries (e.g., pages) are accessed. If a given page is frequently accessed relative to another page in the cache, the given page may be migrated from one cache to another cache with less access latency. As another example, a paging memory management facility may maintain statistics on how frequently cached pages are accessed and use such information to order pages in a cache according to frequency of access and evict pages that are less frequently accessed (e.g., least recently used (LRU) cache replacement policies).

FIG. 1 is a high-level schematic illustration of a computing system 100 which can be configured with a memory centric architecture, in accordance with an embodiment of the invention. The computing system 100 comprises a plurality of application host computing devices 110-1, 110-2, . . . , 110-n (collectively referred to as "application hosts" 110), which are operatively coupled to one or more of a plurality of data storage arrays 120-1, 120-2, . . . , 120-i (collectively referred to as data storage arrays 120), over a network 130. The network 130 may comprise any known communication network such as, but not limited to, a WAN (wide area network), a LAN (local area network), a WLAN (wireless local area network), etc., or combination of networks, which implement networking protocols such as, but not limited to, Internet Protocol (IP), Ethernet, Internet Small Computer System Interface (iSCSI), Fibre Channel (FC), wireless protocols, RDMA (remote direct memory access), NVMe (NVM Express) or Non-Volatile Memory Host Controller Interface Specification (NVMHCI) (which is a specification for accessing solid-state drives (SSDs) attached through a PCI Express (PCIe) bus), or other related communication protocols, etc.

The application hosts 110 are configured to execute applications, such as database applications or other types of applications. In one embodiment, one or more of the application hosts 110 comprises a server (e.g., a Linux server) upon which one or more applications execute. In one embodiment, the application hosts 110 (and data storage arrays 120) are components of a data center which performs data computing and data storage functions to support one or more network applications and/or on-line services that are associated with private or public entities. For example, the computing system 100 of FIG. 1 may comprise a private or public business enterprise network that hosts and manages consumer or business applications, which are used by multiple, simultaneously connected local or remote users. Depending on the implementation of the computing system 100, the application hosts 110 are configured to, e.g., execute business logic, execute scripts and services to query databases, and perform other computing functions that are needed to host and deliver consumer or business applications and services to multiple end users, service providers, and/or organizations.

Moreover, the data storage arrays 120 can be implemented using various types of persistent (non-volatile) storage elements and data storage system architectures. For instance, in one embodiment of the invention, one or more of the data storage arrays 120 may be configured as a SAN system, a DAS system, an HDFS system, as well as other types of data storage systems comprising clustered or distributed virtual and/or physical architectures. The data storage arrays 120 include one or more different types of persistent storage devices such as HDDs (hard disk drives), flash storage devices, disk storage devices, SSD (solid-state drive) devices, or other types and combinations of non-volatile memory. In one embodiment, the data storage arrays 120 comprise one or more storage products such as, by way of example, VNX and Symmetrix VMAX, both commercially available from EMC Corporation of Hopkinton, Mass. The EMC Symmetrix VMAX systems are enterprise-class storage platforms comprising high performance, scalable storage arrays, which can be implemented for hyper-scale computing systems. A variety of other storage products may be utilized to implement at least some of the data storage arrays 120.

In general, the application hosts 110 execute applications using local memory resources and issue read and write requests ("commands") to one or more of the data storage arrays 120. The data storage arrays 120 are configured with storage resources that are used to store backend data files. The data storage arrays 120 process read and write commands received from the application hosts 110 and, in the case of read requests, send data stored thereon back to the requesting one of the application hosts 110. In one embodiment, the computing system 100 provides a memory and storage tier architecture, which comprises one or more tiers resident on the application hosts 110 and one or more tiers resident on the data storage arrays 120. In one embodiment, the applications executing on the application hosts 110 determine (either automatically or in response to user input) which of the various tiers to store data associated with an executing application.

In another embodiment, the computing system 100 may comprise a plurality of virtual machines (VMs) that are implemented using a hypervisor, and which execute on one or more of application hosts 110 or data storage arrays 120. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices. An example of a commercially available hypervisor platform that may be used to implement portions of the computing system 100 in one or more embodiments of the invention is the VMware vSphere which may have an associated virtual infrastructure management system such as the VMware vCenter. The underlying physical infrastructure may comprise one or more distributed processing platforms that include storage products such as the above noted VNX and Symmetrix VMAX products.

In one embodiment of the invention, the computing system 100 of FIG. 1 implements a memory centric architecture (MCA) which provides applications executing on the application hosts 110 with additional virtual memory through a memory extension framework in which a plurality of MCA library functions are provided to efficiently manage multiple user virtual address spaces comprised of combinations of volatile memory, high throughput low latency next generation non-volatile memory technologies, NAND flash technologies connected to a host in various ways (e.g., PCI-e, SAS/SATA), host-connected disk technology, and various forms of SAN connected storage including both server SANs and traditional storage SANs. MCA provides an alternative "kernel-based" virtual memory manager architecture that is configured to overcome the current limitations and non-deterministic behavior provided by conventional virtual memory manager frameworks, such as the Linux virtual memory manager.

In particular, while most operating systems implement virtual memory, applications cannot address the physical memory directly. Instead, the operating system translates between the application's virtual address space and the system's physical address space. In this approach, every program has its own private address space and thus can run independently from other programs on the system. In such a system, the memory is organized in pages (typically 4 KB in size), and the translation between virtual and physical address space is performed using a page table. An MCA framework as described herein provides an interface for creating server class memory (SCM) tiers that extend memory and for accessing and caching SCM tiers by means of virtual memory, with enhanced memory performance, deterministic access latencies, and effective control over virtual memory.

For example, rather than allocating physical pages from a single system wide page cache as in conventional systems, an MCA framework provides a facility to pre-allocate one or more system wide fixed-size page caches. Applications control which page cache to use, which results in a more predictable execution time per process because the OS does not manage a single system wide page cache between competing processes. MCA supports pluggable memory-mapping (mmap) and page cache management policies, which control page cache replacement policies, etc. For example, two policies for deciding which pages to evict from a cache are supported: a first-in, first-out (FIFO) policy, and a least recently used (LRU) policy.

In addition, an application can tune the caching behavior by setting a low water level and an eviction size. The management of each page cache maintains the availability of free physical pages via these settings, e.g., the low water level specifies a threshold for the free memory in a page cache (below which an eviction is triggered), and the eviction size determines the number of pages evicted in such an event. This eviction strategy attempts to ensure page slot availability upon a page fault. Moreover, MCA enables bypassing of a virtual file system of a native OS and directly accessing a storage device driver, which when combined with a compatible storage device, further reduces the page fault latency.

Moreover, in accordance with embodiments of the invention, MCA supports coloring of individual pages to maximize page cache residency times and minimize the number of page faults. For example, a page color (alternatively referred to as page temperature) can be represented as a 16-bit integer, where higher values mean the page is accessed more frequently and should be kept in the page cache when possible. Individual pages may also be pinned based on importance to maintain cache residency. An application is responsible for assigning page colors to pages based on the access pattern or access heuristics of the pages. Moreover, in addition to the explicit specification by the applications, a page cache manager module of the MCA system can be configured to track the access to pages and dynamically adjust page colors based on those statistics.

Furthermore, MCA employs a technique called read ahead, where it preloads a number of subsequent pages starting from the faulting page. Accesses to these pages then only cause minor instead of major page faults and thus have lower latencies. MCA tries to automatically adapt the number of read ahead pages to the applications access patterns. These features promise better performance and control for accessing secondary storage in an in-memory database. This in turn may form the basis of an effective memory tier containing colder data, where the classification of data (e.g., hot and cold) by the database is mapped onto page colors. The underlying MCA library can use this information as a hint for which data should be kept in memory and thus reduce the number of page faults.

Figure 2:
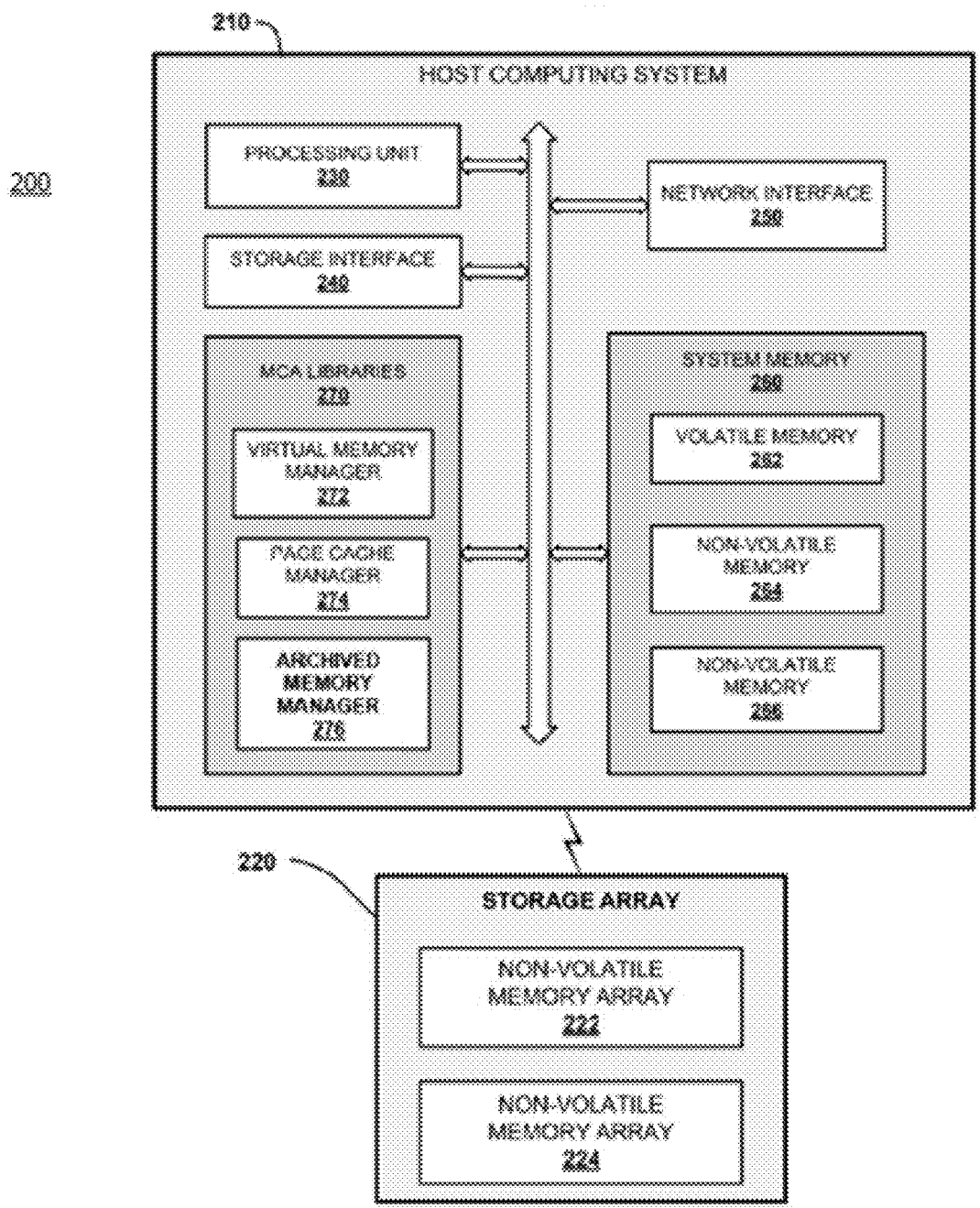
FIG. 2 schematically illustrates an embodiment of the computing system of FIG. 1 showing details of a host computing system and data storage array to implement a memory centric architecture that supports archived memory in accordance with an embodiment of the invention.

FIG. 2 schematically illustrates an embodiment of the computing system 100 of FIG. 1 showing details of a host computing system and data storage array to implement a memory centric architecture in accordance with an embodiment of the invention. More specifically, FIG. 2 shows a computing system 200 comprising a host computing system 210 and a data storage array 220. The host computing system 210 comprises a processing unit 230, storage interface circuitry 240, network interface circuitry 250, system memory 260, and MCA libraries (library functions) 270. The system memory 260 comprises volatile memory 262 and various levels of non-volatile memory 264 and 266. The MCA libraries 270 provide functions for implementing a memory centric architecture, wherein the functions comprise a virtual memory manager module 272, a page cache manager module 274, and an archived memory manager module 276. It is to be understood that in one embodiment of the invention, the MCA library functions 270 may be implemented as software functions that are stored in the system memory 260 and executed by the processing unit 230. In other embodiments, the MCA library functions 270 may be implemented using a combination of dedicated hardware and firmware, in addition to software.

The processing unit 230 comprises one or more of a computer processor, a microprocessor, a microcontroller, an application-specific integrated circuit (ASIC), a field programmable gate array (FPGA) or other types of processing circuitry, as well as portions or combinations of such processing circuitry. Indeed, the processing unit 230 may comprise one or more "hardware processors" wherein a hardware processor is intended to be broadly construed, so as to encompass all types of processors including, for example (i) general purpose processors and (ii) optimized processors, which comprise any possible combination of multiple "throughput cores" and/or multiple hardware-based accelerators. Examples of optimized processors include, for example, graphics processing units (GPUs), digital signal processors (DSPs), system-on-chip (SoC), ASICs, FPGAs, and other types of specialized processors or coprocessors that are configured to execute one or more fixed functions.

The storage interface circuitry 240 enables the processing unit 230 to interface and communicate with the system memory 260 and the non-volatile memory arrays 222 and 224 using one or more standard communication and/or storage control protocols to read, write and otherwise access data in persistent storage devices such as flash memory devices, DAS devices, SAN storage devices, etc., depending on the storage system(s) that are implemented. The network interface circuitry 250 enables the host computing system 210 to interface and communicate with a network and other system components. The network interface circuitry 250 may comprise conventional transceivers of a type well known in the art (e.g., network interface cards, I/O adaptors, etc.).

The system memory 260 comprises electronic memory such as random access memory (RAM), read-only memory (ROM), or other types of memory, in any combination. The system memory 260 stores one more software programs having instructions that are read and processed by the processing unit 230 to run a native operating system (OS) and one or more applications that run on the host computing system 210. The system memory 260 and other persistent storage elements described herein having program code tangibly embodied thereon are examples of what is more generally referred to herein as "processor-readable storage media" that store executable program code of one or more software programs. Other examples of processor-readable storage media embodying program code include, for example, optical or magnetic storage disks.

Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

In accordance with embodiments of the invention, a data storage system comprising the system memory 260 and the data storage array 220 is configured to provide a memory and storage tier architecture, comprising multiple, independent memory/storage tiers. For example, the system memory 260 of the host computing system 210 can provide a hierarchical memory tier structure wherein the volatile memory 262 (highest level in a memory tier) may comprise a dynamic random-access memory tier (e.g., DRAM) or other forms of volatile random-access memory. The non-volatile system memory 264 may comprise a server-class memory (SCM) tier that is accessible as a memory resource. The non-volatile system memory 264 may comprise one or more SCM devices including, for example, NAND flash and next generation non-volatile memory (NGNVM) devices. The non-volatile system memory 266 may comprise an SCM tier that is accessible as an I/O resource.

Moreover, the storage tiers resident on the data storage array 220 include an SCM tier (e.g., non-volatile memory array 222) that is accessible as an I/O resource. For example, the non-volatile memory array 222 may comprise a top of rack flash memory array. Moreover, in one embodiment of the invention, the non-volatile memory array 224 may comprise a network storage tier (e.g., SAN (storage area network)). The data storage array 220 may be implemented using other storage tiers such as a serial attached storage (SAS/SATA) tier, for example. Applications running on the host computing system 210 can make data placement selections end-to-end, e.g., across the different memory/storage tiering layers, or within a given memory/storage tiering layer.

As noted above, the MCA libraries 270 provide functions for implementing a memory centric architecture comprising a hierarchical memory/storage tiering framework, for example, as described herein. The MCA libraries 270 comprise functions that are executable in a "user space" of a native OS (as opposed to a privileged "kernel space" of the OS) to manage virtual memory and to manage multiple independent page caches, each utilizing unique portions of different tiers of available SCM technologies in order to provide the most control of application quality of service (QoS). The pages managed in page caches originate from MCA-defined memory-mapped regions of non-volatile data stores that are included in one or more of the non-volatile memories (e.g., 266, 222, and 224). The memory-mapped regions of the non-volatile data stores provide the ability to persistently maintain page-specific metadata along with the page data itself.

The virtual memory manager module 272 is utilized by an application executing on the host computing system 210 to map a private virtual address space of the application to one or more defined memory-mapped regions of non-volatile data stores, which are resident on one or more of the non-volatile memories (e.g., 266, 222, and 224). This framework enables persistence of page caches associated with one or more executing applications in the event of a reboot of the applications or the host computing system 210. Since DRAM is volatile, meaning that any data that is placed into it is lost upon power failure or other restart events, the repopulation of the application cache is a major operation concern for all application vendors that rely on large DRAM-based caches. However, embodiments of the invention as discussed herein are configured to provide non-volatile caches. For example, since an SCM is a non-volatile resource, the SCM can be used to construct and utilize memory-mapped files to be consumed as an application cache resource, thereby enabling the host computing system

210 to support non-volatile application caches that do not require expensive repopulation after a reboot or unexpected outage of the host computing system 210.

More specifically, in accordance with embodiments of the invention, the virtual memory manager 272 is configured to manage virtual memory having page caches that can be maintained in the volatile memory 262 of the system memory 260 during run-time execution of an application, and which can also be maintained in memory-mapped regions of one or more non-volatile data stores of the tiered memory/storage architecture. A plurality of page caches can be provided in physical memory where each page cache can be shared with multiple memory-mapped regions in tiered memory. An application executing in the user space of the host computing system 210 can utilize the virtual memory manager 272 library function to create one or more memory-mappings for one or more regions in the tiered memory and associate each memory-mapping with one or more page caches. In one embodiment, the page caches are dynamically configurable in size.

In a data storage environment as shown in FIG. 2 comprising a combination of memory tiering and storage tiering, the memory tiers are constructed by memory mapping a region of an SCM device or a region of an array storage device into the virtual address spaces of applications. In one embodiment, each memory mapped region in tiered memory is fronted by a DRAM page cache to which an application issues loads and stores. The virtual memory manager 272 function can be utilized by an application to move data between an SCM or array device and the DRAM page cache on an on-demand page basis.

The page cache manager module 274 actively tracks the usage of each page in a given page cache, and as the access frequency of a given page increases, its perceived importance, reflected by its page color, also increases. The page cache manager 274 and/or the applications executing on the host computing system 210 can track and collect page access patterns and assign a "page color" to a given page based on, e.g., the frequency of access of the page by the application. This persistence of the page color information during run-time provides the ability to restore the associated collection of pages to the most advantageous locations within the cache hierarchy, thereby allowing an application to quickly return to the state of performance previously exhibited based on the persisted page color information.

The archived memory manager module 276 is configured to manage the creation, storage, and subsequent usage of archived memory regions within the MCA framework. The archived memory manager module 276 manages, inter alia, fast bulk writes of region page data and associated metadata, checkpointing of page data and metadata to preserve consistency, fast bulk retrieval of region page data and associated metadata, random read with page addressability, page metadata query, interfacing with third party replication systems for protection and/or migration, as well as various other functions described herein.

It is to be appreciated that the functionalities of one or more of the MCA library manager modules (272, 274, and 276) can be combined into a single manager module. By way of example only, the archived memory manager functionalities can be implemented as part of the virtual memory manager 272.

Object Classification and Identification from Raw Data

Performance and/or cost of data storage can be improved by understanding the content that a user, through an application, stores. One example for improving performance and/or cost includes tiering data storage that recognizes storage media differ in several aspects including price, latency, throughput, availability, reliability, and/or geographic locale. If a storage system understood that certain data was a movie rarely accessed, it could tier that content lower than another data that was a database that may be accessed often.

Applications may have challenges in communicating that content/object identification to a storage system. For example, in some embodiments a Hints Application Programmers Interface ("API") may be provided by tiering software to an application's developers to give "hints" to the tiering software about object classification, importance, and other important information. Throughout this specification "tiering software" may be generalized without limitation to computer software or hardware dedicated to placing or moving content to tiers with different performance and value. In some embodiments the storage system developer and an application may be from the same organization; for example, a database classifier software may provide hints about certain enterprise database objects via the Hints API. This database classifier runs as host software in the database domain, and thus has information that it can provide to the storage system about important objects. If they are from the same organization, they can continue to make iterative changes to the kind of hinting information that is passed to test the utility for the tiering software with regards to hinting information received.

However, more generally the problem remains. It may be difficult it is to work with a vast ecosystem of partners to obtain all of the desired/required knowledge about objects. Some of the historical problems can be categorized as one or more of the following:

Lack of clarity on what hints to ask for; a storage system developer requires engaged application development partners to do a lot of testing on which hints are most effective;

Application development partners may not have a compelling business reason to be providing information to storage system developers;

It may be difficult to establish normative hints between many different application development partners;

The velocity of change between application versions and interrelations between applications may be too great to be working explicitly with comparatively slow partner cycles; and There may simply be too many discrete partners to work with.

By contrast, unilaterally and algorithmically inspecting the content of the data, to provide services/capabilities such as improved performance/cost, specialized searches in cloud infrastructures, object identification/policy management, advanced security and compliance features is disclosed. One such capability would be the ability to independently determine object classification and then provide this information to data management applications such as tiering software, which would be able to set policies that would be beneficial to a customer's overall performance/cost and capacity management goals. The term "unilateral" here refers to the storage system itself performing the inspection rather than relying on one or more application developers.

With regards to specialized searches in cloud infrastructures, search algorithms may depend upon access to information via standard TO infrastructure mechanisms. That is, the data must be accessible on a host computer, via host operating system device access software standards, host virtualization layers, logical volume managers, filesystems, and combinations therein. However, due to snapping, cloning and vaulting technologies, much data may not be accessible by normal host processes. This data is often not mounted to a host, and as such is not searchable or inspectable by normal host processes. In some cases, this amount of information far exceeds the amount of information that is exposed to typical host processors. An advantage of algorithmic inspection is that it is unconcerned with whether the data resource is mounted to a typical use host. Thus it can perform inspection on snaps, clones and vaulted data just the same as data that is mounted to active hosts.

For this reason, algorithmic inspection is able to perform specialized searches for highly secure N-Grams or data with unique statistical signatures that inspection has been instructed and/or trained to find, across all data under control, whether exposed to hosts or not. Host software may not be able to do this. Another advantage is that attempts at obfuscation, such as renaming files, may be caught as well, since algorithmic inspection looks at the internals of the object, rather than metadata such as filenames.

Furthermore, a technique to classify large ranges of objects is disclosed. While small ranges of objects may be less interesting to tiering software, larger objects and object farms may be acted upon effectively by tiering software. Classification routines run on computers, for example in some embodiments may run as R code running inside or a container on any version of Linux, or coded algorithms running on an FPGA. Although the initial object classification target using these methods is for classification of larger ranges of objects, some techniques may be appropriate for individual object identification in certain instances.

Figure 3:
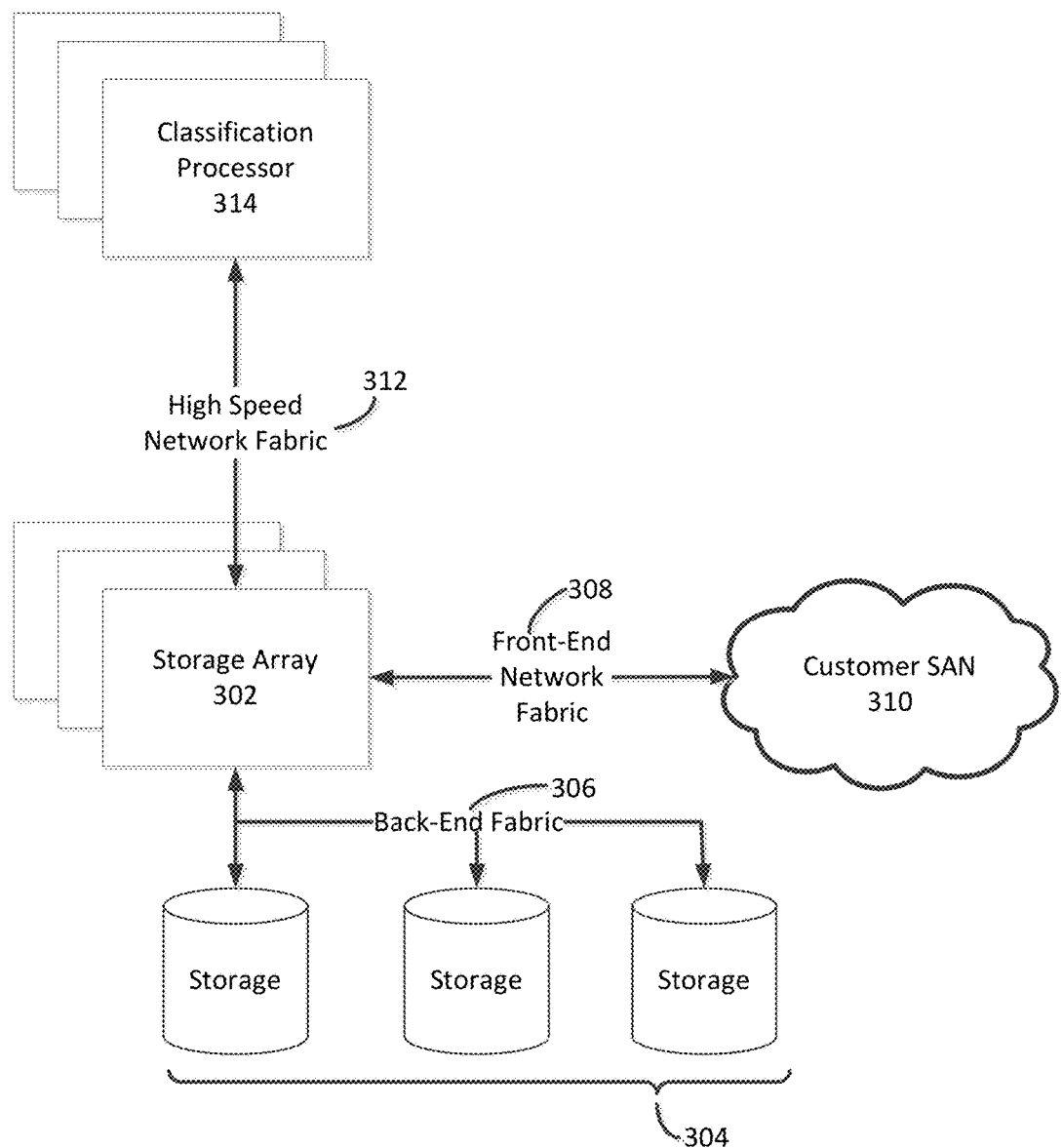
FIG. 3 is a block diagram illustrating an embodiment of a system for object classification and identification from raw data.

FIG. 3 is a block diagram illustrating an embodiment of a system for object classification and identification from raw data. Storage array 302 is coupled to one or more storage devices 304 via back-end fabric 306. Storage array 302 is also coupled via front-end fabric 308 to customer Storage Area Network ("SAN") 310, which includes one or more user/applications. Throughout this specification an "array" may refer to one or more computer servers.

In some embodiments, storage array 302 is coupled via a high speed network fabric 312 to a classification processor(s) 314. Classification processor 314 includes one or more compute servers. for example R code running inside or a container on any version of Linux, or coded algorithms running on an FPGA, and/or other proprietary or open licensed sampling and/or data science software. An example of a high speed network fabric 312 is an Infiniband fabric. In some embodiments, classification processor 314 is integrated within storage array 302 (not shown in FIG. 3).

In some embodiments, storage array 302 is symmetric, for example EMC Symmetrix VMAX arrays. Examples of a storage device 304 include one or more of the following: hard disk drives (including PATA, SCSI, Serial-Attached SCSI, SATA, Fibre Channel ("FC")), tape drives, flash memory, solid state drives ("SSD"), cloud storage systems, PC cards, portable mass storage devices, holographic storage devices, optical storage, offline storage, nearline storage, online storage, and other storage devices. Throughout this specification, the term "LUN" (Logical Unit Number) is a reference to a logical drive on storage device 304. An example of a back-end fabric 306 is an Infiniband fabric.

An example of a front-end fabric 308 is a FC fabric. An example of an application running on a customer SAN 310 includes a database application that uses, for example an Oracle database.

Further information about Object Classification and identification from raw data may be found in U.S. Pat. No. 9,092,159 issued on Jul. 28, 2015, assigned to EMC Corporation of Hopkinton, Mass. and is hereby incorporated by reference in its entirety.

Classification and Identification from Raw Data within a Memory Domain

In many embodiments, the current disclosure may enable classification and/or identification of objects from raw data within a memory centric architecture (MCA). In various embodiments, the current disclosure may enable classification and/or identification of objects without use of hints, tracing, and/or user input related to the objects within a MCA. In certain embodiments, the current disclosure may be enabled to provide the classification and/or identification of objects real-time to a MCA data storage system to improve system performance.

In most embodiments, a Memory Centric Architecture (MCA) may be enabled to provide one or more applications with additional virtual memory through memory extension technology. In various embodiments, MCA may be enabled to provide memory extension by efficiently managing large user virtual address spaces using a limited set of physical memory backed by high throughput low latency next generation non-volatile memory technologies. MCA may be a kernel based virtual memory manager replacement with additional features and performance benefits. In many embodiments, MCA may be designed to overcome current limitations and non-deterministic behavior by the standard Linux virtual memory manager.

Traditionally, most operating systems employ the concept of virtual memory. Typically, applications cannot address the physical memory directly. Generally, an operating system translates between an application's virtual address space and the system's physical address space. Conventionally, every application has its own private address space and thus can run independently from other programs on the system. Typically, in such a system, memory is organized in pages of 4 KB, as an example, and the translation between virtual and physical address space is done using a page table. Traditionally, this mechanism would theoretically allow for an in-memory database system to extend its storage beyond the installed memory. Generally, in practice, however, the system suffers from unpredictable slowdowns due to the transparent execution of the page fault handler and swap subsystem.

In many embodiments, MCA may be enabled to provide an alternative to the Linux virtual memory manager, mmap, msync, and libc malloc implementations. In various embodiments, MCA mmap may be enabled to provide more deterministic access latencies and additional control over virtual memory. In certain embodiments, MCA mmap may be enabled to provide an efficient interface to create server class memory (SCM) tiers that may extend memory. In some embodiments, MCA may be enable a data storage system to access and/or cache SCM tiers by means of virtual memory.

In most embodiments, rather than allocating physical pages from a single system wide page cache, MCA may be enabled to provide a facility to pre-allocate one or more system wide fixed-size page caches. In various embodiments, using MCA, Applications may be enabled to control which page cache to use, which may result in more predictable execution time preprocess because the Operating system no longer manages a single system wide page cache between competing processes. In certain embodiments, MCA may support pluggable mmap and page cache management policies, which may control Operating system services such as page cache replacement policies and/or other services.

In most embodiments, MCA may be enabled to support different policies for deciding which pages to evict from a cache, such as, but not limited to, first-in first-out (FIFO) and least recently used (LRU). In various embodiments, an application using a MCA may be enabled to tune the caching behavior by setting a low water level and/or an eviction size. In some embodiments, management of each page of cache may maintain the availability of free physical pages via two settings. In many embodiments, a lower water level may specify a threshold for the free memory in a page cache, below which an eviction may be triggered. In various embodiments, an eviction size may determine the number of pages evicted in such an event. In certain embodiments, an eviction strategy may attempt to ensure page slot availability upon a page fault. In some embodiments, bypassing an operating system (OS) virtual file system and directly accessing the storage device drive when combined with a compatible storage device driver may further reduce page fault latency. In most embodiments, MCA supports coloring of individual pages to maximize page cache residency times and minimize the number of page faults. A page color (or temperature) may be represented as a 16-bit integer, where higher values may mean the page may be accessed more frequently and should be kept in the page cache when possible.

In most embodiments, individual pages may also be pinned, which may maintain residency of data stored on the page. In various embodiments, an application may be responsible to set the colors appropriately according to its access pattern. In other embodiments, MCA may be enabled to track access to pages and may be enabled to dynamically adjust page colors based on those statistics. In some embodiments, MCA may employ read ahead, where it preloads a number of subsequent pages starting from the fault page. Accesses to these pages may only cause minor page faults instead of major page faults, thus may enable lower latencies. In most embodiments, MCA may attempt to automatically adapt the number of read ahead pages to the application access patterns. In various embodiments, MCA features may enable better performance and control for accessing secondary storage in an in-memory database.

In many embodiments, a MCA enabled data storage system may access raw data from persisted memory pages. In various embodiments, the MCA enabled storage system may process the raw data using one or more sampling techniques. In certain embodiments, the one or more sampling techniques may be used to select one or more portions of sample data. In some embodiments, multiple data science techniques may be used on the sample data to determine a sample data category. In most embodiments, a MCA enabled data storage system may be enabled to identify the application writing the sampled data based on the sample data category. The information gleaned from the sample data category may be used inform tiering and quality of service strategies.

Figure 4:
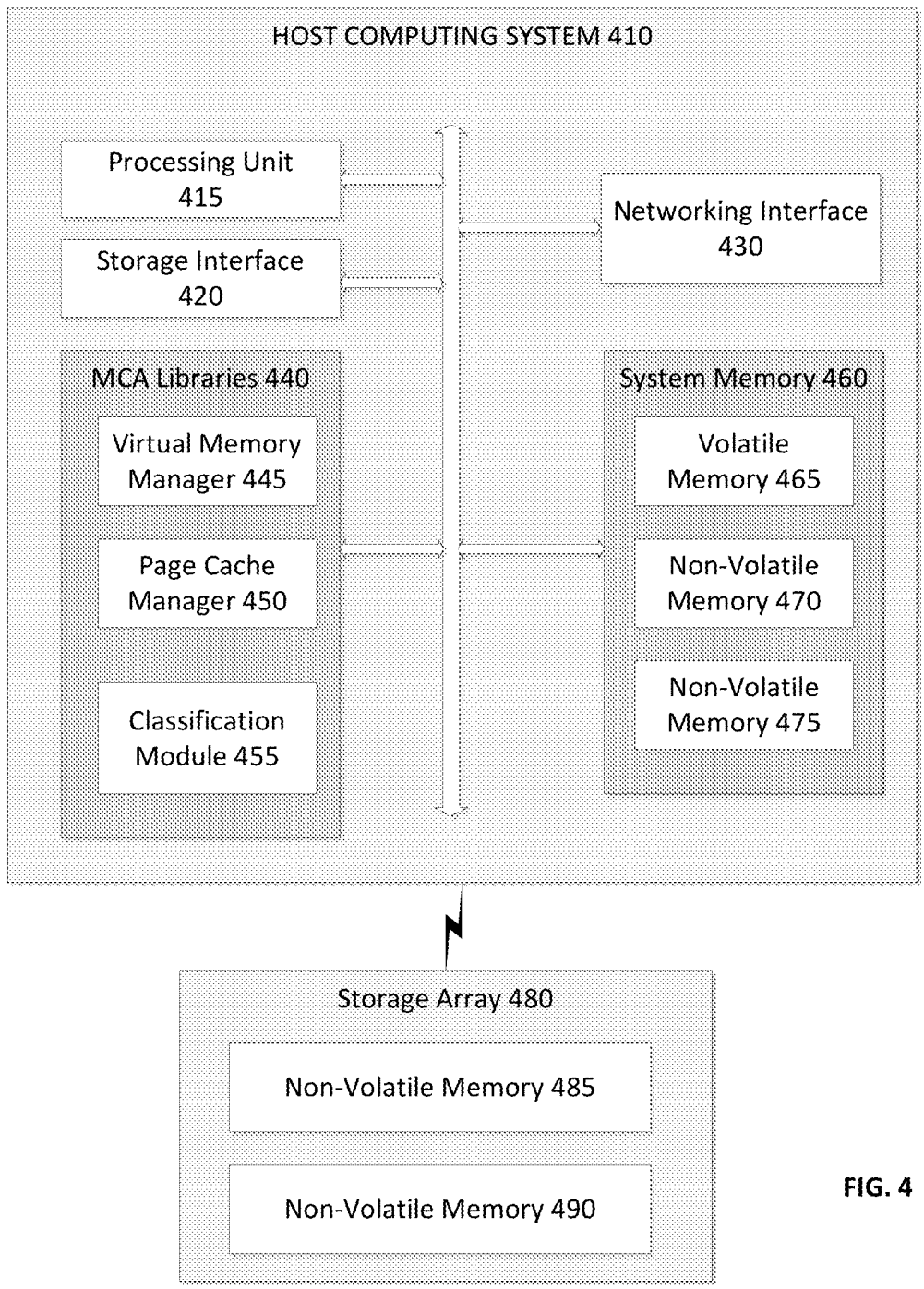
FIG. 4 is a simplified illustration of a host computing system and a data storage array implementing a memory centric architecture that supports object identification, in accordance with an embodiment of the present disclosure.

Refer to the example embodiment of FIG. 4. FIG. 4 is a simplified illustration of a host computing system and a data storage array implementing a memory centric architecture that supports object identification, in accordance with an embodiment of the present disclosure. As shown, system 400 includes host computing system 410 and storage array 480. The host computing system 410 includes a processing unit 415, storage interface circuitry 420, network interface circuitry 430, system memory 460, and MCA libraries 440. The system memory 460 includes volatile memory 465 and various levels of non-volatile memory 470 and 475. The MCA libraries 440 provide functions for implementing a memory centric architecture, wherein functions include a virtual memory manager 445, a page cache manager module 450, and a Classification module 455. It is to be understood that in one embodiment of the invention, the MCA library functions 440 may be implemented as software functions that are stored in the system memory 460 and executed by the processing unit 415. In other embodiments, the MCA library functions 440 may be implemented using a combination of dedicated hardware and firmware, in addition to software.

The storage interface 420 enables the processing unit 415 to interface and communicate with the system memory 460 and the non-volatile memory arrays 485 and 490 using one or more standard communication and/or storage control protocols to read, write, and otherwise access data in persistent storage devices such as flash memory devices, DAS devices, SAN storage devices, etc., depending on the storage system(s) that are implemented. The network interface circuitry 430 enables the host computing system 410 to interface and communicate with a network and other system components.

In accordance with embodiments of the invention, a data storage system comprising the system memory 460 and the data storage array 480 is configured to provide a memory and storage tier architecture, comprising multiple, independent memory/storage tiers. For example, the system memory 460 of the host computing system 410 can provide a hierarchical memory tier structure wherein the volatile memory 465 (highest level in a memory tier) may comprise a dynamic random-access memory tier (e.g., DRAM) or other forms of volatile random-access memory. The non-volatile system memory 470 may comprise a server-class memory (SCM) tier that is accessible as a memory resource. The non-volatile system memory 470 may comprise one or more SCM devices including, for example, NAND flash and next generation non-volatile memory (NGNVM) devices. The non-volatile system memory 475 may comprise an SCM tier that is accessible as an I/O resource.

Moreover, the storage tiers resident on the data storage array 480 include an SCM tier (e.g., non-volatile memory array 485) that is accessible as an I/O resource. For example, the non-volatile memory array 485 may comprise a top of rack flash memory array. Moreover, in one embodiment of the invention, the non-volatile memory array 490 may comprise a network storage tier (e.g., SAN (storage area network)). The data storage array 480 may be implemented using other storage tiers such as a serial attached storage (SAS/SATA) tier, for example. Applications running on the host computing system 410 can make data placement selections end-to-end, e.g., across the different memory/storage tiering layers, or within a given memory/storage tiering layer.

As noted above, the MCA libraries 440 provide functions for implementing a memory centric architecture comprising a hierarchical memory/storage tiering framework, for example, as described herein. The MCA libraries 440 comprise functions that are executable in a "user space" of a native OS (as opposed to a privileged "kernel space" of the OS) to manage virtual memory and to manage multiple independent page caches, each utilizing unique portions of different tiers of available SCM technologies in order to provide the most control of application quality of service (QoS). The pages managed in page caches originate from MCA-defined memory-mapped regions of non-volatile data stores that are included in one or more of the non-volatile memories (e.g., 475, 485, and 490). The memory-mapped regions of the non-volatile data stores provide the ability to persistently maintain page-specific metadata along with the page data itself.

The virtual memory manager module 445 is utilized by an application executing on the host computing system 410 to map a private virtual address space of the application to one or more defined memory-mapped regions of non-volatile data stores, which are resident on one or more of the non-volatile memories (e.g., 475, 485, and 490). This framework enables persistence of page caches associated with one or more executing applications in the event of a reboot of the applications or the host computing system 410. Since DRAM is volatile, meaning that any data that is placed into it is lost upon power failure or other restart events, the repopulation of the application cache is a major operation concern for all application vendors that rely on large DRAM-based caches. However, embodiments of the invention as discussed herein are configured to provide non-volatile caches. For example, since an SCM is a non-volatile resource, the SCM can be used to construct and utilize memory-mapped files to be consumed as an application cache resource, thereby enabling the host computing system 410 to support non-volatile application caches that do not require expensive repopulation after a reboot or unexpected outage of the host computing system 410.

More specifically, in accordance with embodiments of the invention, the virtual memory manager 445 is configured to manage virtual memory having page caches that can be maintained in the volatile memory 465 of the system memory 460 during run-time execution of an application, and which can also be maintained in memory-mapped regions of one or more non-volatile data stores of the tiered memory/storage architecture. A plurality of page caches can be provided in physical memory where each page cache can be shared with multiple memory-mapped regions in tiered memory. An application executing in the user space of the host computing system 410 can utilize the virtual memory manager 445 library function to create one or more memory-mappings for one or more regions in the tiered memory and associate each memory-mapping with one or more page caches. In one embodiment, the page caches are dynamically configurable in size.

In a data storage environment as shown in FIG. 4 comprising a combination of memory tiering and storage tiering, the memory tiers are constructed by memory mapping a region of an SCM device or a region of an array storage device into the virtual address spaces of applications. In one embodiment, each memory mapped region in tiered memory is fronted by a DRAM page cache to which an application issues loads and stores. The virtual memory manager 445 function can be utilized by an application to move data between an SCM or array device and the DRAM page cache on an on-demand page basis.

The page cache manager module 450 actively tracks the usage of each page in a given page cache, and as the access frequency of a given page increases, its perceived importance, reflected by its page color, also increases. The page cache manager 450 and/or the applications executing on the host computing system 410 can track and collect page access patterns and assign a "page color" to a given page based on, e.g., the frequency of access of the page by the application. This persistence of the page color information during run-time provides the ability to restore the associated collection of pages to the most advantageous locations within the cache hierarchy, thereby allowing an application to quickly return to the state of performance previously exhibited based on the persisted page color information.

The Classification module 455 is enabled to analyze memory pages managed by virtual memory manager 445. Classification module 455 is enabled to select sample data, using one or more sampling methodologies, from raw data stored using the memory pages managed by virtual memory manager 445. Classification module 455 is enabled to process sampled data using multiple data science techniques to determine a sample data category. Classification module 455 is enabled to compare the sample data category with known profiles to identify one or more possible applications associated with the sampled data. In many embodiments, real-time identification of application associated with data stored in a MCA may enable a host computing system to make real-time informed decisions on tiering and quality of service strategies for data stored in the MCA.

Figure 5:
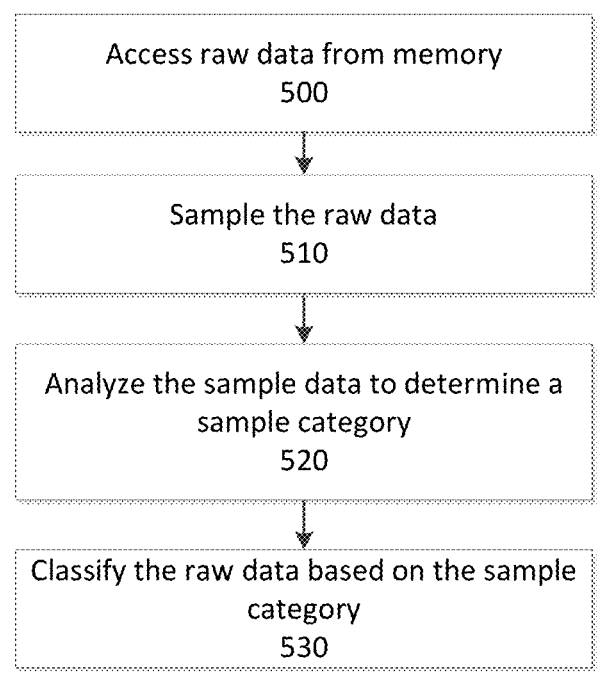
FIG. 5 is a simplified flowchart of a method of identifying raw data in a Memory Centric Architecture (MCA) as shown in FIG. 4, in accordance with an embodiment of the present disclosure.

Refer to the example embodiment of FIG. 5. FIG. 5 is a simplified flowchart of a method of identifying raw data in a Memory Centric Architecture (MCA) as shown in FIG. 4, in accordance with an embodiment of the present disclosure. As shown in FIG. 4, system 400 includes host computing system 410 and storage array 480. The host computing system 410 includes a processing unit 415, storage interface circuitry 420, network interface circuitry 430, system memory 460, and MCA libraries 440. The system memory 460 includes volatile memory 465 and various levels of non-volatile memory 470 and 475. The MCA libraries 440 provide functions for implementing a memory centric architecture, wherein functions include a virtual memory manager 445, a page cache manager module 450, and a Classification module 455.

Periodically, an application utilizing the host computing system 410 is enabled to configure the MCA libraries 440 to activate Classification module 455 to facilitate more efficient usage of memory pages by each application using host computing system 410. In some embodiments, the MCA libraries 440 may periodically scan one or more memory pages to provide host computing system 410 with more information about stored data. Virtual memory manager 445 accesses raw data from memory pages managed by virtual memory manager 445 and sends the raw data to Classification module 455 (Step 500). Raw data may refer without limitation to raw binary data, raw text data, or any data at a low level, wherein low level refers to data without abstractions such as file systems, file-level systems, block-level systems, and so on. In some embodiments, Linux containers running R code and other programs to access raw devices, raw data on memory pages, and/or raw LUNs.

Classification module 455 uses a sample survey technique to sample the raw data (Step 510). For example, the classification module 455 creates sample surveys of desired statistical confidence limits for sampling "chunks" of data on raw memory. In some embodiments, SAS and/or R is used to read the observation chunks based on a survey plan. A chunk may refer to any amount of storage data including that specified in bits, bytes, kilobytes, megabytes, gigabytes, and so on.

Classification module 455 uses a data science technique to determine a sample category for the sampled data (Step 520). For example, the classification module 455 predicts the object classification for the chunk of data against a trained classifier, for example micro-text analysis with naïve Bayes classification. Object classifications can include, but are not limited to one or more of the following: MP3s, MP4As, ID3, mhod, MP4, WMV, Structured Query Language ("SQL") files, music files, video files, photo files, database files, database logs, logs, classification project objects like Digital Corpora as detailed at http://digitalcorpora.org, and objects used in other classification projects. In some embodiments, the classification module 455 records metadata and statistics for a cluster analysis run. A cluster analysis run is made when the statistics have been generated for each observation.

Classification module 455 uses the sample category to classify the raw data (Step 530). In some embodiments, steps 510 through 530 are iterated (not shown in FIG. 5) by classification module 455 to perform survey iteration to determine object farm ranges. For example if the classification module 455 predicts that chunk 123, 275 and 345 are movie information, the movie farm range may include all chunks between chunks 123 through 345. In some embodiments, in this step the classifier 314 also takes note of un-classifiable ranges to save metadata that will allow for dynamic data science analysis. Dynamic data science analysis includes state change analysis, for example Laplace transform, Fourier transform, and Markov chain analysis. In some embodiments, the results of this step include machine learning to adjust the sample survey technique 520 and/or data science technique 530 based on analysis/visualization of the results of classification step 530.

Figure 6:
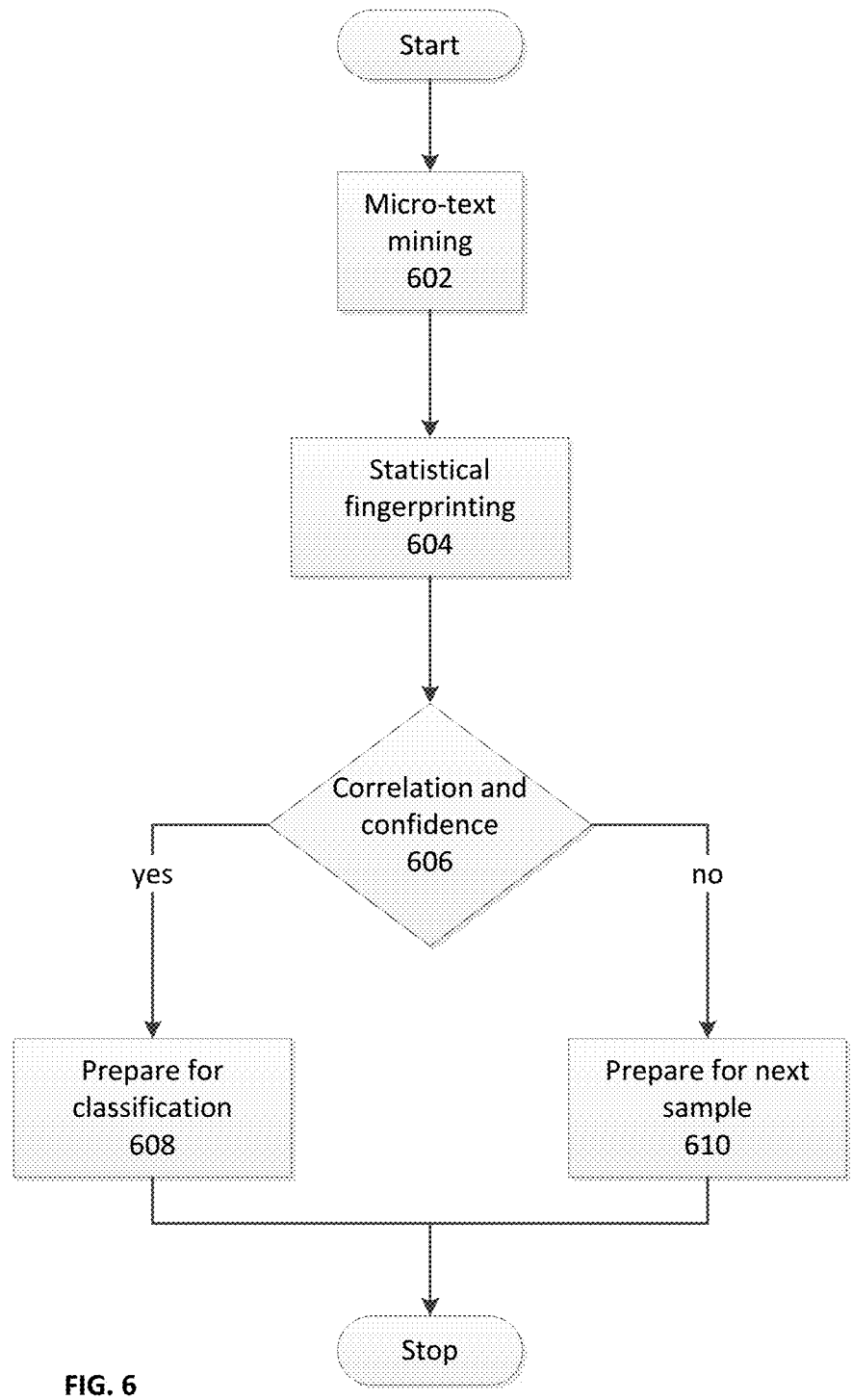
FIG. 6 is a block diagram illustrating an embodiment of data science techniques to categorize and classify.

FIG. 6 is a block diagram illustrating an embodiment of data science techniques to categorize and classify. In some embodiments, the process of FIG. 6 is included in steps 520 and/or 530 of FIG. 5.

In step 602, micro-text mining is used as a data science technique. In some embodiments, long n-gram micro-text mining is used. Micro-text mining looks for discrete characteristics of the content. For example, finding tags and/or long n-grams such as the string "MP3" within a chunk are used as identifiable text characteristics in a Naïve Bayes analysis. In some embodiments, micro-text mining is performed in either SAS, R, and/or other text mining programs. This technique assists with identification of object class, and in some cases may allow for identification of exact objects which can be identified by embedded micro text.

In step 604, statistical fingerprinting is used as a data science technique. In some embodiments, K-means clustering on 4 statistical fingerprints per sample are used. In some embodiments, an object is converted into arrays of numerical vectors, and classification module 455 attempts to assign an observation to the nearest statistically "close" cluster. For example, the technique may without knowing anything special about the content of the data chunk, correlate that a video object may cluster closer to other video objects based purely on a mathematical representation of the information. Classification module 455 applies iterative attempts at K-Means Clustering during this process. Examples of fingerprints include one or more of the following: a Hamming weight, an arithmetic mean, a Shannon entropy, and a Kolomogrov-Smirnov p-value statistical vectors for each observation. Classification processor 314 then performs k-clustering around those variables. In various embodiments, other statistical vectors may be used.

Example statistical fingerprints using these include:
Arithmetic Mean. Sum of byte values (0-255) for the observation divided by observation size (32K)
Hamming Weight. Numbers of bit-level 1's in the observation divided by total numbers of bits in the observation.
Kolomogrov-Smirnov. p-value against object paradigm distribution. If values are >0.05, the system cannot rule out that observation comes from the same byte distribution as the sample compared against.
Shannon Entropy. Computed using bi-grams (2 bytes at a time). Represents a measure of skew (lower entropy) or randomness (higher entropy) in the observation.

In step 606, the above two/three data science techniques are correlated and confidence is established to the classification. If there is informal and/or formal convergence towards a classification, control is transferred to step 608 to prepare the object range for classification. Otherwise, control is transferred to step 610 wherein the next sample is prepared for analysis.

Figure 7:
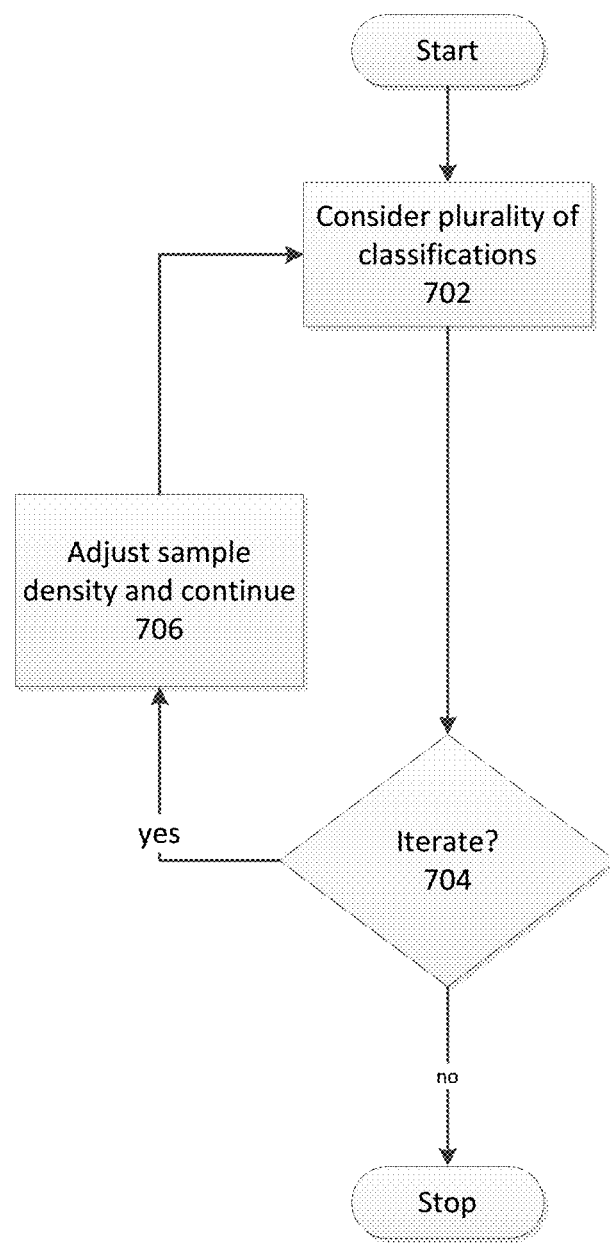
FIG. 7 is a block diagram illustrating an embodiment of survey sample iteration technique for sampling.

FIG. 7 is a block diagram illustrating an embodiment of survey sample iteration technique for sampling. In some embodiments, the process of FIG. 6 is included in steps 510 of FIG. 5.

In some embodiments, the selection of object chunks to analyze relies on sample survey techniques to select data for inspection and iteration. Sampling, as opposed to inspecting all of the at-rest data on a storage device, improves feasibility by reducing data processing resources/machine costs and improving analysis speeds on classification module 455. A primary benefit of using sampling to is to spend as little time and/or machine cost as possible on a memory page where no object classification can be determined and/or the memory page is of little interest. Sample surveys techniques including SAS's SURVEYSELECT procedure, and/or a simple randomizer for selection of memory page slices for inspection using a simple random sampling ("SRS") based on a uniform, normal, or other distribution/frequency.

In some embodiments, a preparation phase using OS command functions (awk, dd, etc.)
or other code to read the observations as directed by the sample survey from the raw device memory pages. A set of observations is created to be used by the statistical package, for example R,SAS, and/or MADlib. This methodology may be changed to other methods efficient for CPU consumption.

Any chunk sizes for micro-text mining and statistical fingerprinting as described in FIG. 6 may be used in varying embodiments. The chunk sizes for micro-text mining may be larger, smaller, or equal to those for statistical fingerprinting. These chunk sizes and sampling methods are independent and without limitation may be fine tuned based upon implementation, and degree of desired statistical accuracy.

In step 702, the classification module 455 considers a plurality of classifications. For example, when two or more samples on a memory page are estimated by the classification module 455 to have the same object classification, the classification module 455 inspects closer to see in finer detail the boundary of where that object class starts and/or stops as shown in step 704.

If it is determined to be of interest for iteration in step 704, control is transferred to step 706 and sample density (or without limitation other parameters of the sample survey technique, not shown) are adjusted and the flow continued. Otherwise, control is transferred to stop the iteration. For example, a sample survey looks at memory page chunks (1, 2, 3, 123, 275, 536, 1224, . . . , n−3, n−2, n−1, n). Classification module 455 predicts that chunks 123, 275, and 536 are database log structured information. In this case, rather than bailing on this memory page and moving on, classification module 455 may be configured to investigate more detail about the boundaries of what has been discovered. In some embodiments, a survey design is run with higher sampling percentage, and the classifier inspects estimates for the observations between a and b, wherein:
a=first observation on memory page that is not of desired object class b=last observation of memory page that is not of desired object class c=first observation on memory page that is from desired object class d=last observation on memory page that is from desired object class Adjusting sampling percentage in an iteration method yields a more granular bounding of the object class objects albeit at a greater machine cost. In some embodiments, a more sophisticated model increases the confidence, increases the chunk size and uses an adjusted classifier for prediction on the larger chunk inspection, in part to reduce machine cost.

There may be a mini/max functional relationship between the chunk size, the number of chunks sampled, and the accuracy of the system, given a range of data to inspect for identification of object farms:

Sample Survey Technique.

A sampling technique is chosen over the range. Simple random sampling with additional samples at the beginning and end of the range may be used, alternately other more sophisticated methods may be used in some embodiments. For example, a 2 MB chunk size used for N-Gram micro-text inspection may be used, while a smaller chunk size for the statistical fingerprints may be used, since the large size may provide no extra significance with extra machine computation cost. As the chunk size increases, the machine cost increases. In the case of N-Grams, the accuracy increases. In the case of statistical fingerprints it does not seem to.

Range Iteration.

Once locked into a range of objects that are all one type with current sampling analysis, the system may test that hypothesis further by increasing the accuracy. Increasing the chunk size for that range and/or increasing the number of chunks in the sample are ways to do this. Sampling allows the system to stop looking at any unproductive ranges within short order.

Another example of iteration uses a Range Iteration Routine. There are several range iteration algorithms that reduce machine cost. For example, an algorithm may re-run the sample survey routine at an escalating percentage. An original sample survey may call for 1% random observations on a memory page. If observation 25, 50 and 75 were each classified as log objects, and there were no sampled objects in between, classification module 455 may initially believe that they have probably found a log object range. A Range Iteration Routine works as follows:

Step 1. Rerun the Sample Survey Routine using 5% SRS (or other selection). The flat file of observation selections may now have many more observations to classify between 25-75 as well as <25 and >75; and Step 2. Using this greater precision for the range, the algorithm may either suggest that the premise that a range was discovered is false, or give the upper and lower boundaries of the range.

Generally, the target applications of performance/cost, such as tiering, do not require, and rarely achieve 100% accuracy of object placement. If the range misses an observation or two on either end, it is generally not catastrophic, in comparison to replication or ACID (Atomicity, Consistency, Isolation, Durability) compliant types of features.

Encryption. In some embodiments, data is encrypted. Encryption-at-rest is not a problem given where the implemented classification module 455 code/layer may execute in the computational stack in classification module 455, where data would be presented to the application as un-encrypted when read. Any raw data accessed will have been already un-encrypted just as with any other external host access.

Data that is written to the array already encrypted by, for example RSA encryption software, can be unencrypted prior to inspection. In that example, an RSA client in conjunction with an RSA key manager can get key (e.g. K1) corresponding to the client data mapping, decrypt the data using key and seed, then process on classification module 455.

Network Traffic. In some embodiments, additional functionality acts by analyzing network traffic to look for application fingerprints and attempt to describe which application objects have been observed being accessed on which host stack hierarchies. This sophisticated technique is only effective for data being accessed.

In many embodiments, whoever data may be unencrypted by the time it is in the page cache, a classification module may be enabled to inspect the unencrypted data. In various embodiments, encrypted data within the page cache may require additional steps to decrypt the data prior to using any of the abovementioned inspection techniques.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
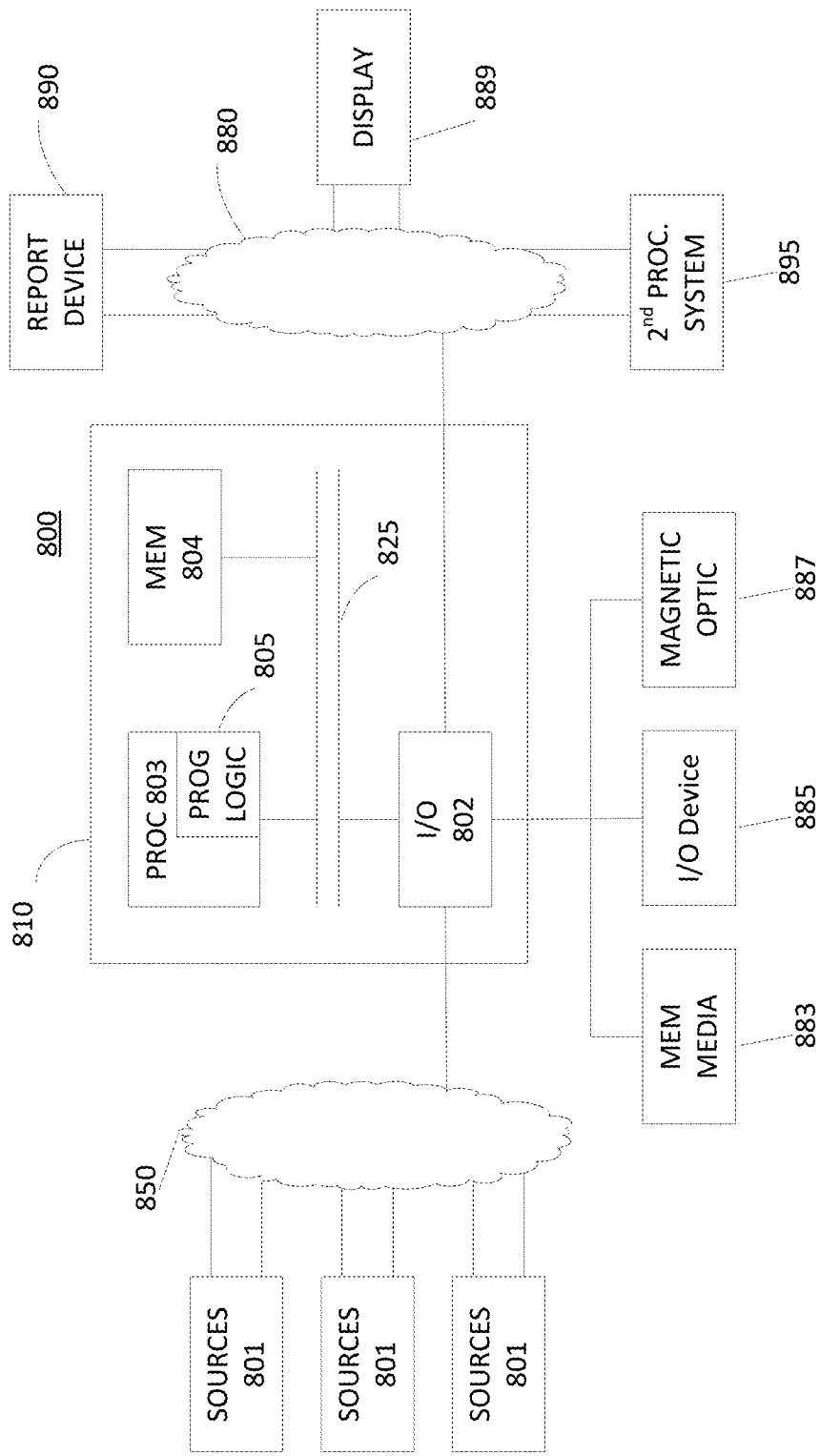
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The one or more I/O ports 802 may provide connectivity to memory media 883, I/O devices 885, and drives 887, such as magnetic drives, optical drives, or Solid State Drives (SSD). The computer 810 is configured to communicate with a plurality of sources 801 via a network 850 using the one or more I/O ports 802. The computer 810 is further configured to communicate with a display 889, a report device 590, and a second processing system 895 via a network 880 using the one or more I/O ports 802. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
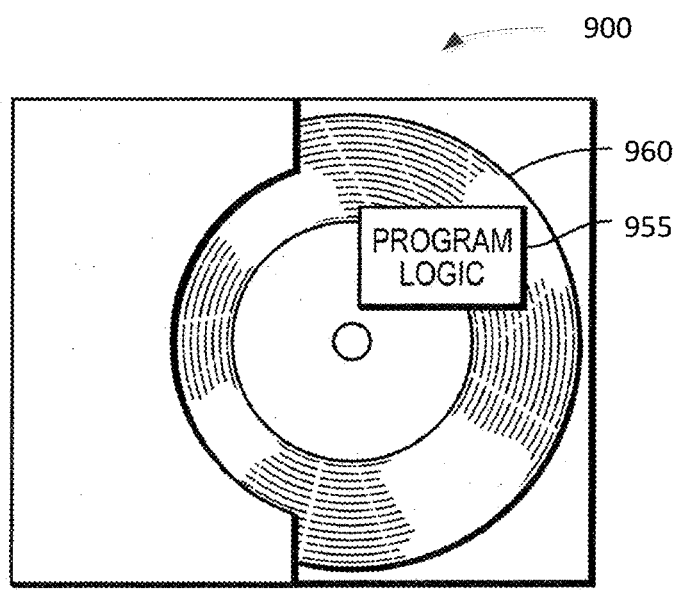
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing one or more tiers of memory of a host computing system, the computer-executable method comprising:
   accessing a portion of low level, raw data from a memory page associated with data stored on the one or more tiers of memory;
   sampling the portion of low level, raw data to select a sample data chunk;
   analyzing the sample data chunk to determine a sample category; and
   classifying the portion of low level, raw data based at least in part by considering the sample category, wherein the classifying further comprises creating a sample survey of a desired statistical confidence limit for the sample data chunk.

2. The computer-executable method of claim 1, wherein the analyzing comprises micro-text mining the sample data chunk.

3. The computer-executable method of claim 1, wherein the analyzing comprises clustering using statistical fingerprinting.

4. The computer-executable method of claim 3, wherein statistical fingerprinting includes using one or more of the following: a Hamming weight, an arithmetic mean, a Shannon entropy, and a Kolomogrov-Smirnov p-value.

5. The computer-executable method of claim 1, further comprising providing the classification to the host computing system to enable the host computing system to optimize data stored on the one or more tiers.

6. The computer-executable method of claim 1, wherein the one or more tiers of memory are provided from one or more memory devices.

7. The computer-executable method of claim 6, wherein the one or more memory devices includes volatile and non-volatile memory.

8. A system, comprising:
   a host computing system including one or more tiers of memory; and
   computer-executable program logic encoded in memory of one or more computers enabled to manage the one or more tiers of memory, wherein the computer-executable program logic is configured for the execution of:
      accessing a portion of low level, raw data from a memory page associated with data stored on the one or more tiers of memory;
      sampling the portion of low level, raw data to select a sample data chunk;
      analyzing the sample data chunk to determine a sample category; and
      classifying the portion of low level, raw data based at least in part by considering the sample category, wherein the classifying further comprises creating a sample survey of a desired statistical confidence limit for the sample data chunk.

9. The system of claim 8, wherein the analyzing comprises micro-text mining the sample data chunk.

10. The system of claim 8, wherein the analyzing comprises clustering using statistical fingerprinting.

11. The system of claim 10, wherein statistical fingerprinting includes using one or more of the following: a Hamming weight, an arithmetic mean, a Shannon entropy, and a Kolomogrov-Smirnov p-value.

12. The system of claim 8, wherein the computer-executable program logic is further configured for the execution of providing the classification to the host computing system to enable the host computing system to optimize data stored on the one or more tiers.

13. The system of claim 8, wherein the one or more tiers of memory are provided from one or more memory devices.

14. The system of claim 13, wherein the one or more memory devices includes volatile and non-volatile memory.

15. A computer program product for managing one or more tiers of memory of a host computing system, the computer program product comprising:
   a non-transitory computer readable medium encoded with computer-executable code, the code configured to enable the execution of:
      accessing a portion of low level, raw data from a memory page associated with data stored on the one or more tiers of memory;
      sampling the portion of low level, raw data to select a sample data chunk;
      analyzing the sample data chunk to determine a sample category; and
      classifying the portion of low level, raw data based at least in part by considering the sample category, wherein the classifying further comprises creating a sample survey of a desired statistical confidence limit for the sample data chunk.

16. The computer program product of claim 15, wherein the analyzing comprises micro-text mining the sample data chunk.

17. The computer program product of claim 15, wherein the analyzing comprises clustering using statistical fingerprinting.

18. The computer program product of claim 17, wherein statistical fingerprinting includes using one or more of the following: a Hamming weight, an arithmetic mean, a Shannon entropy, and a Kolomogrov-Smirnov p-value.

19. The computer program product of claim 15, wherein the code is further configured to enable the execution of providing the classification to the host computing system to enable the host computing system to optimize data stored on the one or more tiers.

20. The computer program product of claim 15, wherein the one or more tiers of memory are provided for more than one memory device.

* * * * *